United States Patent [19]
Occelli

[11] Patent Number: 4,994,250
[45] Date of Patent: Feb. 19, 1991

[54] PROCESS FOR SYNTHESIZING A MOLECULAR SIEVE HAVING THE OFFRETITE STRUCTURE AND CONTAINING ALUMINUM AND GALLIUM

[75] Inventor: Mario L. Occelli, Yorba Linda, Calif.

[73] Assignee: Union Oil Company of California, Los Angeles, Calif.

[21] Appl. No.: 414,471

[22] Filed: Sep. 29, 1989

[51] Int. Cl.$^5$ .............................................. C01B 33/28
[52] U.S. Cl. ...................................... 423/328; 423/326
[58] Field of Search ............... 423/326, 328, 329, 330; 502/61

[56] References Cited

U.S. PATENT DOCUMENTS

| | | | |
|---|---|---|---|
| 3,431,219 | 3/1969 | Argauer | 423/328 |
| 3,578,398 | 5/1971 | Jenkins | 423/328 |
| 4,340,573 | 7/1982 | Vaughan et al. | 423/328 |
| 4,495,303 | 1/1985 | Kuehl | 423/328 |
| 4,521,297 | 6/1985 | Angevine et al. | 423/328 |
| 4,803,060 | 2/1989 | Occelli | 423/326 |

FOREIGN PATENT DOCUMENTS 1182096  2/1985  Canada .

OTHER PUBLICATIONS

S. Hayashi, K. Suzuki, S. Shin, K. Hayamizu and O. Yamamoto, "High Resolution $^{29}$Si Nuclear Magnetic Resonance Study on Gallosilicates with Zeolitic Structures," *Bull. Chem. Soc. Jpn.*, vol. 58, 1985, pp. 52–57.
J. M. Newsam, D. E. W. Vaughan, "Structural Studies of Gallosilicate Zeolites," *New Developments in Zeolite Science and Technology*, Proceedings of the 7th International Zeolite Conference, Tokyo, 1986, pp. 457–464.
U.S. Patent Application Ser. No. 904,027, "Crystalline Galliosilicate with the Offretite Structure," Occelli, filed Sep. 4, 1986.
U.S. Application Ser. No. 398,770, "Process for Synthesizing a Molecular Sieve Having the Faujasite Structure and Containing Aluminum and Gallium," Occelli, filed Aug. 25, 1989.

*Primary Examiner*—JOhn Doll
*Assistant Examiner*—R. Bruce Breneman
*Attorney, Agent, or Firm*—Yale S. Finkle; Gregory F. Wirzbicki

[57] ABSTRACT

A crystalline, gallioaluminosilicate molecular sieve having the offretite structure is synthesized by mixing a substantially gallia-free aluminosilicate hydrogel containing a templating or directing agent with a galliosilicate solution substantially free of alumina to form a mixture and then crystallizing the resultant mixture, usually in 24 hours or less.

37 Claims, 2 Drawing Sheets

PROCESS FOR SYNTHESIZING A MOLECULAR SIEVE HAVING THE OFFRETITE STRUCTURE AND CONTAINING ALUMINUM AND GALLIUM

BACKGROUND OF THE INVENTION

This invention relates to crystalline molecular sieves containing both aluminum and gallium and is particularly concerned with a method for synthesizing a crystalline gallioaluminosilicate having the offretite structure.

Zeolites are well known natural and synthetic molecular sieves that can be defined as crystalline, three-dimensional aluminosilicates consisting essentially of alumina and silica tetrahedra which interlock to form discrete polyhedra. The polyhedra are interconnected to form a framework which encloses cavities or voids that are interconnected by channels or pores. The size of the cavities and pores will vary depending on the framework structure of the particular zeolite. Normally, the cavities are large enough to accommodate water molecules and large cations which have considerable freedom of movement, thereby permitting sorption, reversible dehydration and ion exchange. The dimensions of the cavities and pores in a zeolite are limited to a small number of values and can vary from structure to structure. Thus, a particular zeolite is capable of sorbing molecules of certain dimension while rejecting those of dimensions larger than the pore size associated with the zeolite structure. Because of this property zeolites are commonly used as molecular sieves.

In addition to their molecular sieving properties, zeolites show a pronounced selectivity toward polar molecules and molecules with high quadrupole moments. This is due to the ionic nature of the crystals which gives rise to a high nonuniform electric field within the micropores of the zeolite. Molecules which can interact energetically with this field, such as polar or quadrupolar molecules, are therefore sorbed more strongly than nonpolar molecules. This selectivity toward polar molecules is the unique property of zeolites which allows them to be used as drying agents and selective sorbents.

The pore size of a zeolite can vary from about 2.6 Angstroms for analcime to about 10.0 Angstroms for zeolite omega. The term "pore size" as used herein refers to the diameter of the largest molecule that can be sorbed by the particular zeolite or other molecular sieve in question. The measurement of such diameters and pore sizes is discussed more fully in chapter 8 of the book entitled "Zeolite Molecular Sieves," written by D. W. Breck and published by John Wiley & Sons in 1974, the disclosure of which book is hereby incorporated by reference in its entirety. The pore size range of 2.6 to 10.0 Angstroms is particularly suited for molecular separation and catalytic processing. Analcime will sorb ammonia while excluding larger molecules whereas zeolite omega will sorb perfluorotributyl amine $[(C_4F_9)_3N]$ while excluding any molecule having a diameter greater than about 10.0 Angstroms. All of the other approximately 150 zeolites now known have pore sizes falling within the range between 2.6 and 10.0 Angstroms.

In addition to their use as drying agents and selective sorbents, zeolites are widely used as components of chemical conversion catalysts. As found in nature or as synthesized, zeolites are typically inactive because they lack acid sites. In general, acid sites are created by subjecting the zeolite to an ion exchange with ammonium ions followed by some type of thermal treatment which creates acid sites by decomposing the ammonium ions into gaseous ammonia and protons. Activated zeolites have been used in many types of chemical conversion processes with the smaller pore zeolites being used to selectively sorb and crack normal and moderately branched chain paraffins.

Because of the unique properties of zeolitic molecular sieves, there have been many attempts at synthesizing new molecular sieves by either substituting an element for the aluminum or silicon present in zeolitic molecular sieves or adding another element in addition to the aluminum and silicon. The term "zeolite" or "zeolitic" as used herein refers to molecular sieves whose frameworks are formed of substantially only silicon and aluminum atoms in tetrahedral coordination with oxygen atoms. One such class of new molecular sieves that has been created is that in which a portion of the framework aluminum has been replaced by gallium. Specifically, it has been reported in Canadian Patent No. 1,182,096 that gallioaluminosilicate molecular sieves having a structure similar to that of offretite have been synthesized. The synthesis process, as illustrated in Examples 1 through 3 of the patent, involves mixing a colloidal silica gel with gallium (III) oxide, sodium hydroxide, potassium hydroxide, sodium aluminate or aluminum hydroxide, water and tetramethylammonium chloride to form a mixture which is stirred and then heated in a closed vessel at 95° C. or above. According to the examples, crystallization times ranged between 72 and 120 hours. Although such times are not excessive, shorter crystallization times will result in substantial savings in the energy required for crystallization.

Accordingly, it is one of the objects of the present invention to provide a relatively simple and rapid process for synthesizing a crystalline, gallioaluminosilicate molecular sieve having the offretite structure, which sieve may be useful in many types of chemical conversion processes, particularly hydrocarbon conversion processes. This and other objects of the invention will become more apparent in view of the following description of the invention.

SUMMARY OF THE INVENTION

In accordance with the invention it has now been found that a crystalline, gallioaluminosilicate molecular sieve comprising silicon, aluminum, gallium and oxygen and having the offretite crystal structure can be synthesized by mixing a source of alumina, a source of silica, a source of one alkali metal, a source of a different alkali metal, an offretite selective templating or directing agent and water to form a hydrogel substantially free of gallia in which the components have the following oxide mole ratios:

$SiO_2/Al_2O_3 = 8$ to $15$ $(M_2O + N_2O)/Al_2O_3 = 1$ to $10$ $H_2O/Al_2O_3 = 80$ to $1000$ $Q_2O/Al_2O_3 = 0.1$ to $10$ where M is an alkali metal, N is an alkali metal other than M and Q is a cation derived from the templating agent. After the above-described hydrogel is formed, it is mixed with a galliosilicate solution substantially free of alumina prepared by mixing a source of gallia, a source of silica, a source of one of the alkali metals used to form the aluminosilicate hydrogel and water. The mole ratio of alkali metal oxide-to-gallia in the galliosilicate solution is sufficiently large to prevent gel formation, or, if a gel does form, to facilitate dissolution of the gel upon vigorous stirring. The components comprising the solution are typically present in the following oxide mole ratios:

$SiO_2/Ga_2O_3 = 5$ to 30

$(M_2O \text{ or } N_2O)/Ga_2O_3 = 6$ to 20

$H_2O/Ga_2O_3 = 200$ to 800

After the alumina-free solution is added to the gallia-free aluminosilicate hydrogel, the mixture is crystallized, normally with gentle agitation, at a temperature below about 250° C., preferably below 150° C., to form a crystalline, gallioaluminosilicate molecular sieve having the offretite structure. This molecular sieve typically has the composition, expressed in terms of oxide mole ratios in the anhydrous state, of:

$aAl_2O_3:bGa_2O_3:cSiO_2:dM_2O:zN_2O:tQ_2O$ where a equals 0.5 to 0.99, b equals (1−a), c equals 5.5 to 30, d equals 0.1 to 0.9, z equals 0.1 to 0.9, t equals 0.1 to 0.6, and z+d+t equals about 1.0. The X-ray powder diffraction pattern of the molecular sieve contains at least the d-spacings set forth in Table 1 below, which d-spacings are characteristic of a zeolite with the offretite structure.

TABLE 1

| Interplanar d-spacings (Angstroms) | Relative Intensity (100 × I/I$_o$) |
|---|---|
| 11.52 ± 0.50 | 80–100 |
| 6.64 ± 0.20 | 30–60 |
| 4.34 ± 0.15 | 30–60 |
| 3.77 ± 0.15 | 50–100 |
| 3.61 ± 0.10 | 50–75 |
| 2.86 ± 0.10 | 70–90 |

In a preferred gallioaluminosilicate molecular sieve, M is sodium, N is potassium, and Q is a quaternary ammonium cation.

DETAILED DESCRIPTION OF THE INVENTION

Figure 1:
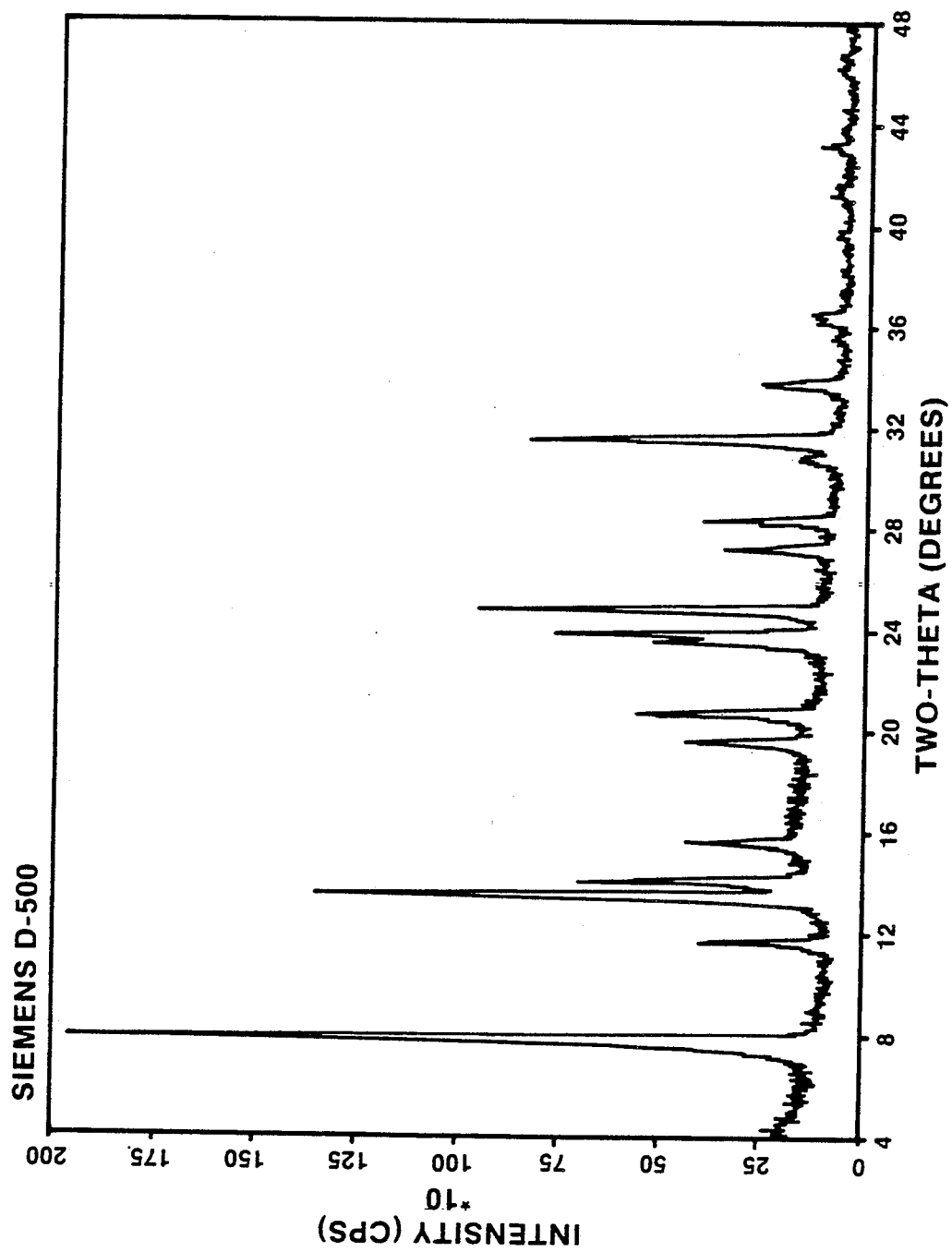
FIG. 1 in the drawing shows the X-ray powder diffraction pattern of a zeolite with the offretite structure.

A crystalline, gallioaluminosilicate molecular sieve having the offretite structure is prepared by crystallizing a mixture of an aluminosilicate hydrogel and a galliosilicate solution essentially free of alumina and particulates. The aluminosilicate hydrogel is formed separately from the galliosilicate solution by mixing a source of alumina, a source of silica, a source of two different alkali metals and an offretite selective templating agent with water under conditions such that the various components react to form the desired hydrogel. The galliosilicate solution is formed by mixing a source of gallia, a source of silica and a source of one of the alkali metals used to form the aluminosilicate hydrogel with water in the absence of an organic templating or directing agent to form the desired solution. The gallioaluminosilicate molecular sieve formed upon crystallization of the mixture will normally contain between about 10 weight percent and about 20 weight percent alumina, preferably between about 13 and 17 weight percent, and between about 0.5 weight percent and about 10.0 weight percent gallia, preferably between about 1.0 and 6.0 weight percent.

The silica used in forming the aluminosilicate hydrogel and the galliosilicate solution may be in the form of sodium silicate, silica hydrosols, silica gels, silica salts, silicic acid sols, silicic acid gels, aerosils, organic silica salts such as tetramethylammonium silicate and methyltriethoxysilane, and reactive amorphous solid silicas. The source of the silica can be in either the liquid or solid state. Examples of reactive, amorphous solid silicas that may be used include fumed silicas, chemically precipitated silicas, and precipitated silica sols usually having a particle size of less than 1 micron in diameter. The preferable sources of silica are sodium silicates (water glass) and aqueous colloidal dispersions of silica particles.

The alumina used to produce the aluminosilicate hydrogel may be in the form of aluminum oxide with or without waters of hydration, aluminum hydroxide, an inorganic aluminum salt such as aluminum nitrate, sulfate, chloride or acetate, sodium aluminate or aluminum alkoxydes. The use of sodium aluminate is normally preferred.

The source of alkali metals used in forming the aluminosilicate hydrogel and the galliosilicate solution may be any alkali metal salt or hydroxide. Although any combination of two different alkali metal sources may be utilized in forming the hydrogel, it is preferable that a source of sodium and a source of potassium be employed. A source of one of the alkali metals used to form the hydrogel is normally used to prepare the galliosilicate solution with a source of sodium being preferred. It is possible for the source of alkali metal used to prepare the galliosilicate solution to also be the source of gallia utilized to form the solution. Alkali metal gallates are examples of materials which serve as a source of both an alkali metal and gallia.

The gallia used to produce the galliosilicate solution may be in the form of gallium oxide, gallium hydroxide, an alkali metal gallate or an inorganic gallium salt, such as gallium nitrate, gallium sulfate, or gallium acetate. As mentioned above, the source of the gallia may also be the source of the alkali metal required to form the galliosilicate solution. In fact, a preferred source of gallia is prepared by dissolving gallium oxide in an aqueous solution of sodium hydroxide to form sodium gallate which is then used as a component to form the galliosilicate solution.

The templating agent used to form the aluminosilicate hydrogel is normally any organic compound which, when in solution, yields cations, such as quaternary ammonium cations and protonated amines, that direct crystallization of the hydrogel toward the offretite structure, i.e., are offretite selective. Typically, the templating agent is either an amine or a quaternary ammonium compound. Examples of amines useful as the templating agent include ethylene diamine, diethyl triamine, triethylene tetraamine, and alkanolamines.

The preferred templating agents are quaternary ammonium compounds, such as tetramethyl, tetrapropyl, tetraethyl or tetrabutylammonium halide or hydroxide, choline chloride, and benzyltrimethylammonium chloride or hydroxide. The most preferred templating agents for use in making the aluminosilicate hydrogel of the invention are tetramethylammonium halides.

The aluminosilicate hydrogel used to form the mixture from which the gallioaluminosilicate molecular sieve having the offretite structure is crystallized is normally prepared first dissolving the source of alumina in a solution containing a mixture of two alkali metal hydroxides, preferably potassium and sodium hydroxide. The resulting solution is then mixed with an offretite selective templating agent and a source of silica to form the gel which is then vigorously stirred. A sufficient amount of the alumina source, the silica source, the sources of alkali metals, the templating agent and water is used so that the resultant hydrogel contains the following oxide mole ratios of components:

$SiO_2/Al_2O_3 = 8$ to 15, preferably 9 to 12

$(M_2O + N_2O)/Al_2O_3 = 1$ to 10, preferably 2 to 5

$H_2O/Al_2O_3 = 80$ to 1000, preferably 100 to 400

$Q_2O/Al_2O_3 = 0.1$ to 10, preferably 0.5 to 4.0 where M is an alkali metal, preferably sodium, N is another alkali metal, preferably potassium, and Q is a cation derived from the templating agent, preferably a quaternary ammonium cation.

The galliosilicate solution that is added to the hydrogel to form the crystallization mixture is substantially free of alumina and dispersed particles and is typically prepared by dissolving a source of gallia in an aqueous alkali metal hydroxide and mixing the resulting solution with a silica source. A sufficient amount of the gallia source, the silica source, the alkali metal source and water is used so that the resultant mixture contains the following oxide mole ratios of components:

$SiO_2/Ga_2O_3 = 5$ to 30, preferably 10 to 20

$(M_2O$ or $N_2O)/Ga_2O_3 = 6$ to 20, preferably 8 to 15

$H_2O/Ga_2O_3 = 200$ to 800, preferably 300 to 500

Generally, a sufficient amount of the alkali metal source is used so that the alkali metal/gallia ratio is such that a gel is not formed when the components are mixed together or, if a gel is formed upon the mixing of the components, it can be forced into solution by stirring at ambient temperature.

After the aluminosilicate hydrogel and the galliosilicate solution have been separately prepared, a sufficient amount of the solution is added to the hydrogel so that the resultant mixture, which remains in a gel form, contains between about 1 and about 40 weight percent of the solution, preferably between about 10 and 30 weight percent. Normally, the oxide mole ratios of components in the resultant mixture will fall within the following ranges:

$SiO_2/(Ga_2O_3 + Al_2O_3) = 8$ to 30, preferably 9 to 16

$(M_2O + N_2O)/(Ga_2O_3 + Al_2O_3) = 1$ to 15, preferably 3 to 6

$H_2O/(Ga_2O_3 + Al_2O_3) = 80$ to 1000, preferably 100 to 300

$Q_2O/(Ga_2O_3 + Al_2O_3) = 0.1$ to 10, preferably 0.5 to 4

The mixture is then stirred at atmospheric pressure and at a temperature between about 20° C. and about 60° C., preferably at about ambient temperature, for from about 1 hour to about 2 days, preferably between about 1 hour and about 10 hours. After stirring, the mixture is crystallized by heating, with or without stirring or agitation, for between about 8 hours and 48 hours, usually in less than about 24 hours and preferably in less than about 15 hours, at a temperature in the range between about 70° C. and 250° C., preferably between about 90° C. and 175° C., and most preferably between about 90° C. and 120° C. The temperature is normally controlled within the above ranges to avoid the formation of phase impurities. After the hydrogel has been crystallized, the resulting slurry is passed to a filter, centrifuge or other separation device to remove the excess reactants or mother liquor from the crystallized molecular sieve. The crystals are then washed with water and dried at a temperature between about 50° C. and about 200° C. to remove surface water.

The dried crystals produced as described above will normally have the following composition expressed in terms of oxide mole ratios in the anhydrous state:

$$aAl_2O_3 : bGa_2O_3 : cSiO_2 : dM_2O : zN_2O : tQ_2O \qquad (1)$$

where M is an alkali metal, preferably sodium, N is an alkali metal other than M, preferably potassium, Q is a cation derived from an offretit selective templating agent, a equals 0.5 to 0.99, b equals (1−a), c equals 5.5 to 30, preferably 6 to 15, equals 0.1 to 0.9, z equals 0.1 to 0.9, t equals 0.1 to 0.6 and the sum of d, z, and t equals approximately 1.0. The X-ray powder diffraction pattern of the crystallized molecular sieve of the invention will typically contain at least the d-spacings set forth in Table 1, preferably the d-spacings set forth in Table 2 below.

TABLE 2

| Bragg Angle 2-Theta (Degrees) | Interplanar d-spacings (Angstroms) | Relative Intensity (100 × $I/I_o$) |
|---|---|---|
| 7.5–7.9 | 11.78–11.18 | 80–100 |
| 11.4–11.8 | 7.75–7.49 | 15–50 |
| 13.1–13.5 | 6.75–6.55 | 30–70 |
| 13.7–14.2 | 6.46–6.23 | 50–25 |
| 15.2–15.6 | 5.82–5.67 | 15–30 |
| 19.1–19.6 | 4.64–4.52 | 20–60 |
| 20.2–20.6 | 4.39–4.31 | 30–60 |
| 23.0–23.5 | 3.86–3.78 | 20–60 |
| 23.4–23.8 | 3.80–3.73 | 70–100 |
| 24.4–24.9 | 3.64–3.57 | 50–80 |
| 26.7–27.2 | 3.33–3.27 | 15–30 |
| 28.0–28.5 | 3.19–3.13 | 20–40 |
| 31.0–31.6 | 2.88–2.83 | 50–90 |
| 33.1–33.8 | 2.70–2.65 | 10–35 |
| 36.0–36.4 | 2.49–2.47 | 5–25 |

The X-ray powder diffraction data set forth in Tables 1 and 2 are characteristic of a molecular sieve having the offretite structure. For comparison purposes, the X-ray powder diffraction pattern of a synthetic zeolite with the offretite structure is shown in FIG. 1, and the corresponding X-ray powder diffraction data are set forth in Table 3.

TABLE 3

X-Ray Powder Diffraction Data for a Synthetic Zeolite with the Offretite Structure

| Bragg Angle 2-Theta (Degrees) | Interplanar d-spacings (Angstroms) | Relative Intensity ($100 \times I/I_o$) |
|---|---|---|
| 7.780 | 11.3532 | 100.0 |
| 11.687 | 7.5718 | 15.7 |
| 13.515 | 6.5513 | 63.8 |
| 14.057 | 6.3001 | 30.1 |
| 15.613 | 5.6753 | 14.4 |
| 19.580 | 4.5336 | 16.6 |
| 20.714 | 4.2879 | 23.6 |
| 23.553 | 3.7771 | 22.4 |
| 23.860 | 3.7292 | 35.2 |
| 24.838 | 3.5846 | 44.1 |
| 27.244 | 3.2732 | 11.8 |
| 28.388 | 3.1438 | 16.7 |
| 30.820 | 2.9011 | 4.7 |
| 31.559 | 2.8349 | 40.8 |
| 33.775 | 2.6552 | 9.9 |
| 36.299 | 2.4748 | 3.5 |
| 36.471 | 2.4615 | 4.6 |
| 43.185 | 2.0931 | 3.3 |
| 47.887 | 1.8995 | 3.8 |

The X-ray powder diffraction data set forth in Tables 1 and 2 for the crystalline gallioaluminosilicate produced in accordance with the process of invention are based on data obtained using a Siemens D-500 X-ray diffractometer with graphite-crystal monochromatized Cu-K alpha radiation. The peak heights I, and their position as a function of 2-theta, where theta is the Bragg angle, were read from the diffractometer output. From this output the relative intensities, $100 \times I/I_o$, where $I_o$ is the intensity of the strongest peak, were read. The interplanar spacing, d, in Angstroms corresponding to the recorded peaks were then calculated in accordance with standard procedures. It will be understood that the peak heights and d-spacings associated with the X-ray powder diffraction pattern of the gallioaluminosilicate molecular sieve may vary somewhat depending on various factors, e.g., heat treatment, unit cell composition, crystal size, and whether the molecular sieve has been exchanged with hydrogen ions or metal cations.

The water content of the crystalline, gallioaluminosilicate molecular sieve will depend on the method used for drying the particles formed upon crystallization. The amount of cations derived from the templating agent present in the dried molecular sieve will depend upon the silica-to-(gallia+alumina) mole ratio and the alkali metal content of the gallioaluminosilicate crystals. In general, the moles t of $Q_2O$ present, as shown in formula (1) above, will equal about 1.0 minus the sum of the moles of the two different alkali metal oxides present, z+d.

After the synthesized gallioaluminosilicate crystals have been washed and dried, they are typically treated in order to render them active for acid catalyzed reactions. This procedure normally comprises calcining the washed and dried crystals in air at a temperature between about 400° C. and about 700° C., preferably between about 500° C. and about 600° C., for between about 5 hours and about 15 hours to decompose the cations derived from the templating agent into gaseous products. After this calcination, the gallioaluminosilicate molecular sieve is exchanged with ammonium ions, hydrogen ions, polyvalent cations such as rare earth-containing cations, magnesium cations or calcium cations, or a combination of ammonium ions, hydrogen ions, and polyvalent cations, thereby lowering the sodium content to below about 2.0 weight percent, preferably below about 1.0 weight percent and most preferably below about 0.05 weight percent, calculated as $Na_2O$. When reducing the sodium content using an ammonium ion exchange technique, the molecular sieve is typically slurried for 1 to 5 hours at a temperature above ambient temperature but less than about 100° C. in an aqueous solution containing a dissolved ammonium salt, such as ammonium nitrate, ammonium sulfate, ammonium chloride and the like. Ordinarily, to achieve extremely low levels of alkali metal cations, the ion exchange procedure will be repeated at least twice, and occasionally several times. After the ammonium exchange or other treatment to reduce alkali metal content, the molecular sieve is again calcined in air, preferably at a temperature between about 350° C. and 550° C. to decompose the ammonium cations into ammonia, which is driven off during the calcination step, and thereby produce the catalytically active hydrogen form of the gallioaluminosilicate molecular sieve.

A crystalline, gallioaluminosilicate molecular sieve produced in accordance with the process of the invention and activated as described above may be used as a component of a catalyst for converting hydrocarbons and other organic compounds into more valuable reaction products by acid catalyzed reactions, such as alkylation, transalkylation, dealkylation, isomerization, dehydrocyclization, dehydrogenation, hydrogenation, cracking, hydrocracking, dewaxing, hydrodewaxing, oligomerization, aromatization, alcohol conversion reactions, the conversion of syngas to mixtures of hydrocarbons and the like. A preferred oligomerization reaction in which a catalyst containing such a sieve may be used is the conversion of low molecular weight olefins into cycloparaffins and/or aromatic compounds.

In utilizing a gallioaluminosilicate molecular sieve produced in accordance with the process of the invention as a catalyst component in conversion processes as described above, it will normally be combined with a porous, inorganic refractory oxide component, or a precursor thereof, such as alumina, silica, titania, magnesia, zirconia, beryllia, silica-alumina, silica-magnesia, silica-titania, a dispersion of silica-alumina in gamma alumina, a clay such as kaolin, hectorite, sepiolite or attapulgite, combinations of the above and the like. The preferred porous, inorganic refractory oxide component will depend upon the particular conversion process involved and will be well known to those skilled in the art. Examples of precursors that may be used include peptized alumina, alumina gels, hydrated alumina, silica-alumina gels, hydrogels, Ziegler-derived aluminas and silica sols. The exact amounts of crystalline gallioaluminosilicate and porous, inorganic refractory oxide used in the catalyst will again depend upon the particular conversion process in which the catalyst is to be used.

It will be understood that, although the primary use of the catalyst of the invention will be in hydrocarbon conversion processes to convert hydrocarbon feedstocks into desirable reaction products, the catalyst can also be used to convert feedstocks or organic compounds other than hydrocarbons into desired reaction products. For example, the catalyst can be used to convert alcohols into transportation fuels and to convert gaseous mixtures of carbon monoxide and hydrogen into hydrocarbons.

Depending on the particular type of conversion process in which the catalyst containing a gallioaluminosilicate molecular sieve with the offretite structure is to be used, it may be desirable that the catalyst also contain a metal promoter or combination of metal promoters selected from Group IB, Group IIB, Group IIIA, Group IVA, Group VA, Group VIB, Group VIIB and Group VIII of the Periodic Table of Elements. As used herein "Periodic Table of Elements" refers to the version found in the inside front cover of the "Handbook of Chemistry and Physics," 65th edition, published in 1984 by the Chemical Rubber Company, Cleveland, Ohio. Specific metal components which may be used as promoters include components of copper, silver, zinc, aluminum, gallium, indium, thallium, lead, tin, antimony, bismuth, chromium, molybdenum, tungsten, manganese, iron, cobalt, nickel, ruthenium, rhodium, palladium, iridium, platinum, rhenium, thorium and the rare earths. These metal promoters may be ion exchanged into the crystalline gallioaluminosilicate itself, they may be incorporated into the mixture of the crystalline gallioaluminosilicate and the porous, inorganic refractory oxide, or they may be added by impregnation after the catalyst particles have been formed.

The catalyst is normally prepared by mulling the activated form of the crystalline gallioaluminosilicate molecular sieve produced in accordance with the process of the invention with the porous, inorganic refractory oxide component. If desired, a binder such as peptized Catapal alumina may be incorporated into the mulling mixture, as also may be one or more active promoter metal precursors. After mulling, the mixture is extruded through a die having openings of a cross sectional size and shape desired in the final catalyst particles. For example, the die may have circular openings to produce cylindrical extrudates, openings in the shape of three-leaf clovers so as to produce an extrudate material similar to that shown in FIGS. 8 and 8A of U.S. Pat. No. 4,028,227, the disclosure of which is hereby incorporated by reference in its entirety, or openings in the shape of four-leaf clovers. Among preferred shapes for the die openings are those that result in particles having surface-to-volume ratios greater than about 100 reciprocal inches. If the die opening is not circular in shape, it is normally desirable that the opening be in a shape such that the surface-to-volume ratio of the extruded particles is greater than that of a cylinder. After extrusion, the extruded catalyst particles are broken into lengths of from 1/16 to ½ inch and calcined in air at a temperature of at least 750° F., usually between about 800° F. and about 1200° F., and preferably in the range between about 900° F. and 1050° F.

As mentioned previously, metal promoter components may be mulled, either as a solid or liquid, with a gallioaluminosilicate prepared in accordance with the process of the invention and the porous, inorganic refractory oxide component to form the catalyst extrudates prior to the calcination step. Alternatively, the metal promoter component or components may be added to the catalyst by impregnation after the calcination step. The metal promoter component or components may be impregnated into the calcined extrudates from a liquid solution containing the desired metal promoter component or components in dissolved form. In some cases, it may be desirable to ion exchange the calcined extrudates with ammonium ions prior to adding the metal promoter component or components. After the calcined extrudates have been impregnated with the solution containing the metal promoter component or components, the particles are dried and calcined in the air at a temperature normally ranging between about 800° F. and about 1100° F. to produce the finished catalyst particles.

In addition to the crystalline, gallioaluminosilicate molecular sieve having the offretite structure, the catalyst may also contain other molecular sieves such as aluminosilicates, borosilicates, aluminophosphates, silicoaluminophosphates, naturally occurring zeolites, pillared clays and delaminated clays. Suitable aluminosilicates for combining with the crystalline gallioaluminosilicate include Y zeolites, ultrastable Y zeolites, X zeolites, zeolite beta, zeolite L, faujasite and zeolite omega. The actual molecular sieve used in combination with the crystalline gallioaluminosilicate will depend upon the particular conversion process in which the resultant catalyst is to be used. The molecular sieve of choice is normally incorporated into the catalyst by mixing the molecular sieve with a crystalline gallioaluminosilicate and porous, inorganic refractory oxide prior to mulling and extrusion.

It is typically preferred to use catalysts containing the crystalline gallioaluminosilicate molecular sieve synthesized in accordance with the process of the invention as a cracking or oligomerization catalyst in the absence of added hydrogen or in hydroconversion processes such as hydrocracking, isomerization and hydrodewaxing. When used in hydroconversion processes, the catalyst will normally contain hydrogenation components comprising metals selected from Group VIII and/or Group VIB of the Periodic Table of Elements. These hydrogenation metal components are incorporated into the catalyst extrudates either prior to or after extrusion. Examples of Group VIII and Group VIB metal components that may be used include nickel, cobalt, tungsten, molybdenum, palladium and platinum components. In some cases, it may be desirable that the catalyst contain at least one Group VIII metal component and at least one Group VIB metal component. When this is the case, the preferred combination is a nickel and/or cobalt component with a molybdenum and/or tungsten component.

If the hydrogenation metal component consists essentially of one or more noble metals such as platinum or palladium or compounds thereof, it is generally desired that the finished catalyst particles contain between about 0.05 and about 10 weight percent of the hydrogenation metal component, preferably between about 0.10 weight percent and about 3.0 weight percent, calculated as the metal. If on the other hand, the hydrogenation metal component consists essentially of one or more non-noble metals, such as nickel or nickel and tungsten or compounds thereof, it is normally desired that the finished catalyst particles contain between about 1.0 and about 40 weight percent of the hydrogenation metal components, preferably between about 3 weight percent and about 30 weight percent, calculated as the metal oxide.

Feedstocks that may be subjected to hydroconversion processes using a catalyst containing a gallioaluminosilicate synthesized in accordance with the process of the invention include mineral oils, synthetic oils, such as shale oil, oil derived from tar sands and coal liquids, and the like. Examples of appropriate feedstocks for hydroconversion processes include straight run gas oils, vacuum gas oils and catalytic cracker distillates. Preferred hydroconversion feedstocks include gas oils and other hydrocarbon fractions having at least about 50 weight percent of their components boiling above about 700° F.

In general, the temperature at which the hydroconversion process takes place is between about 450° F. and about 850° F., preferably between about 600° F. and about 800° F. The pressure will normally range between about 750 and about 3500 p.s.i.g., preferably between about 1000 and about 3000 p.s.i.g. The liquid hourly space velocity (LHSV) is typically between about 0.3 and about 5.0 reciprocal hours, preferably between about 0.5 and about 3.0 reciprocal hours. The ratio of hydrogen gas to feedstock utilized will usually range between about 1000 and about 10,000 scf/bbl, preferably between about 2000 and about 8000 scf/bbl as measured at 60° F. and one atmosphere.

Since a crystalline, gallioaluminosilicate molecular sieve produced in accordance with the process of the invention has the offretite structure, its pore size will be about 6.0 Angstroms, a pore size which makes such a gallioaluminosilicate particularly suited for use as a component of a catalyst employed in dewaxing or hydrodewaxing processes. Dewaxing and hydrodewaxing differ from hydrocracking in that these processes involve the selective cracking of molecules and produce a product having a boiling point range similar to that of the feedstock because essentially only the straight and slightly branched chain paraffin molecules in the feedstock are cracked while essentially all the highly branched chain paraffins, aromatic and cyclic molecules in the feedstock remain unchanged. Hydrocracking, on the other hand, involves the indiscriminate or nonselective cracking of molecules in the presence of added hydrogen and always results in a product having a boiling point range significantly different from that of the feedstock because a substantial proportion of all types of molecules comprising the feedstock are converted into lower boiling components. Hydrodewaxing differs from dewaxing in that the former is carried out in the presence of added hydrogen while the latter is not. When catalysts containing a crystalline gallioaluminosilicate with the offretite structure are used in dewaxing or hydrodewaxing processes, the boiling point of the effluent from the dewaxing or hydrodewaxing zone will be approximately the same as the boiling point of the feedstock. In the case of maximum conversion in the dewaxing or hydrodewaxing zone, the boiling point of the effluent will be no more than about 20° F. lower than that of the feedstock.

The nature and objects of the invention are further illustrated by the following examples, which are provided for illustrative purposes only and not to limit the invention as defined by claims. The examples demonstrate a simple and rapid method of synthesizing a crystalline gallioaluminosilicate molecular sieve with the offretite structure and illustrate that the amount of gallia in the sieve can be controlled by the amount of gallia used in the hydrogel from which the sieve is crystallized.

EXAMPLE 1

A sodium gallate solution is prepared by mixing in a glass beaker gallium oxide of a 99.99% purity with an aqueous solution of sodium hydroxide made by dissolving commercial grade sodium hydroxide crystals in distilled water. The mixture of gallium oxide and sodium hydroxide is vigorously stirred under boiling conditions until the gallium oxide is completely dissolved. After stirring, Ludox HS-40, a silica sol solution manufactured and sold by the DuPont Chemical Company, is added dropwise to the stirred mixture to form a hydrogel. The resultant hydrogel is stirred at room temperature until the gel passes into solution generating a clear liquid galliosilicate solution free of dispersed particles and having the following composition expressed in terms of oxide mole ratios:

$$Ga_2O_3:15\ SiO_2:10\ Na_2O:400\ H_2O$$

An aqueous solution of potassium hydroxide and sodium hydroxide is then prepared in a second glass beaker by dissolving commercial grade potassium hydroxide and sodium hydroxide crystals in distilled water. Sodium aluminate is then added to the solution and the resultant mixture is vigorously stirred under boiling conditions until the sodium aluminate is completely dissolved. Tetramethylammonium chloride is then added to the basic solution, and the resultant mixture is stirred for an additional 30 minutes. After stirring, Ludox HS-40 silica sol is added to the stirred mixture to form an aluminosilicate hydrogel having the following composition expressed in terms of oxide mole ratios:

$$Al_2O_3:10.8\ SiO_2:1.05\ Na_2O:2.31\ K_2O:1.05$$
$$[(CH_3)_4N]_2O:189\ H_2O$$

After the aluminosilicate hydrogel is formed, a sufficient amount of the galliosilicate solution prepared in the first container is slowly added to the second container so that the resultant mixture has the following composition expressed in terms of oxide mole ratios:

$$0.95\ Al_2O_3:0.05\ Ga_2O_3:11.0\ SiO_2:1.5\ Na_2O:2.2$$
$$K_2O:1.0[(CH_3)_4N]_2O:200\ H_2O$$

The mixture of the aluminosilicate hydrogel and the galliosilicate solution, which is itself a gel, is then stirred at ambient temperature for about 1 hour. The hydrogel is then transferred to an autoclave and heated at about 100° C. for about 12 to 14 hours before crystallization is complete. The crystals of gallioaluminosilicate formed are washed with hot distilled water to remove excess reactants and then dried. The dried crystals have the following composition expressed in terms of oxide mole ratios in the anhydrous state:

$$0.96\ Al_2O:0.04\ Ga_2O_3:7.70\ SiO_2:0.13\ Na_2O:0.58 \tag{2}$$
$$K_2O:0.29\ [(CH_3)_4N]_2O$$

Figure 2:
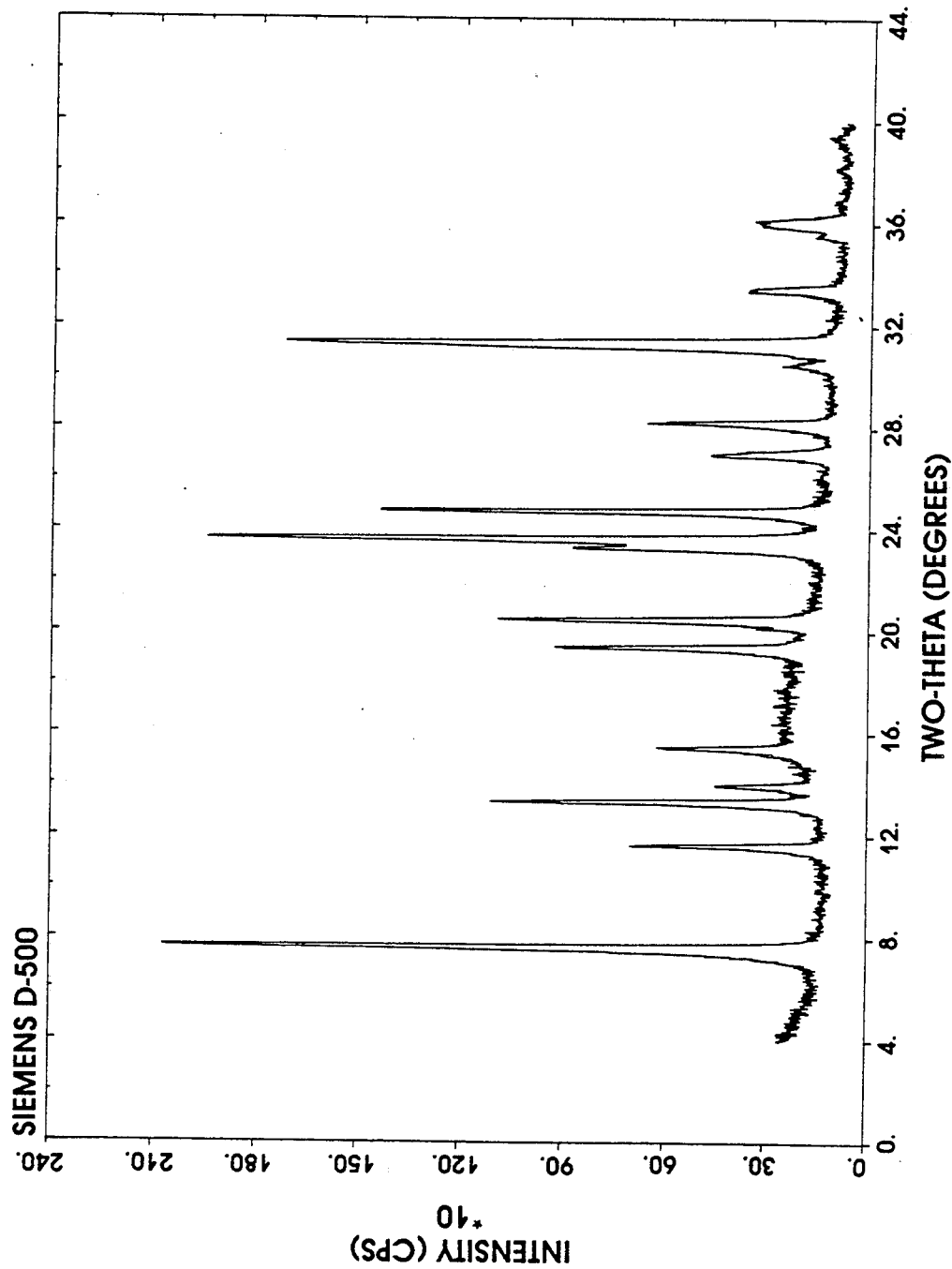
FIG. 2 depicts the X-ray powder diffraction pattern of a molecular sieve synthesized in accordance with the process of the invention as exemplified in Example 1.

An X-ray diffractogram of the crystals is obtained using a Siemens D-500 X-ray diffractometer with graphite-crystal monochromatized Cu-K alpha radiation. The resultant X-ray powder diffraction pattern is shown in FIG. 2 and the corresponding X-ray powder diffraction data including the calculated d-spacings are set forth in Table 4 below.

TABLE 4

X-Ray Powder Diffraction Data for the Crystalline Gallioaluminosilicate of Example 1

| Bragg Angle 2-Theta (Degrees) | Interplanar d-spacings (Angstroms) | Relative Intensity (100 × I/I$_o$) |
|---|---|---|
| 7.682 | 11.4992 | 100.0 |
| 11.650 | 7.5899 | 30.7 |
| 13.369 | 6.6178 | 49.8 |
| 14.004 | 6.3189 | 15.0 |
| 14.537 | 6.0884 | 3.0 |
| 15.472 | 5.7224 | 22.4 |

TABLE 4-continued

X-Ray Powder Diffraction Data for the Crystalline Gallioaluminosilicate of Example 1

| Bragg Angle 2-Theta (Degrees) | Interplanar d-spacings (Angstroms) | Relative Intensity (100 × $I/I_o$) |
|---|---|---|
| 19.438 | 4.5630 | 38.7 |
| 20.519 | 4.3250 | 48.8 |
| 23.351 | 3.8064 | 38.8 |
| 23.677 | 3.7547 | 94.5 |
| 24.769 | 3.5916 | 68.2 |
| 27.000 | 3.2997 | 18.6 |
| 28.252 | 3.1562 | 29.0 |
| 30.534 | 2.9254 | 7.2 |
| 31.367 | 2.8495 | 83.6 |
| 32.297 | 2.7696 | 2.7 |
| 33.461 | 2.6758 | 14.6 |
| 35.599 | 2.5199 | 3.2 |
| 36.106 | 2.4857 | 11.4 |
| 38.193 | 2.3545 | 2.5 |
| 39.412 | 2.2845 | 2.8 |

The X-ray powder diffraction pattern set forth in FIG. 2 is substantially similar to that set forth in FIG. 1 for a zeolite with the offretite structure. Thus, it is concluded that the crystalline gallioaluminosilicate synthesized in Example 1 has the offretite structure. The d-spacing values for the synthesized gallioaluminosilicate set forth in Table 4 are generally higher than the corresponding values for a zeolite with the offretite structure. These increases in d-spacing values are consistent with larger unit cell parameters for the gallioaluminosilicate as shown in Table 5 below.

TABLE 5

Unit Cell Parameters

| Molecular Sieve | $a_o$ (Angstroms) | $c_o$ (Angstroms) |
|---|---|---|
| Synthetic offretite zeolite* | 13.075 | 7.552 |
| Example 1 sieve** | 13.204 | 7.567 |
| Example 2 sieve** | 13.232 | 7.574 |
| Example 3 sieve** | 13.287 | 7.580 |

*Contains aluminum but no gallium.
**Crystalline gallioaluminosilicate with the offretite structure.

The larger unit cell parameters for the gallioaluminosilicate synthesized in Example 1, i.e., $a_o$ of 13.204 angstroms and $c_o$ of 7.567 angstroms, as compared to those for a synthetic offretite zeolite are attributed to the isomorphous substitution of gallium, which has a larger ionic radius than aluminum, for aluminum in the offretite framework structure.

The crystals of the gallioaluminosilicate formed in the autoclave are subjected to calcination in flowing air at a temperature of 550° C. to decompose the tetramethylammonium cations. The resultant crystals are then ion exchanged with ammonium ions by slurrying the crystals in a 3 molar solution of ammonium nitrate. The ammonium-exchanged galliosilicate crystals are then calcined at 600° C. for 10 hours. The resultant crystals have a BET surface area of 440 m²/gram and retain about 100 percent of their original crystallinity.

EXAMPLE 2

An aluminosilicate hydrogel and a galliosilicate solution are prepared as described in Example 1 and mixed together in proportions such that the resulting mixture has the following composition expressed in terms of oxide mole ratios:

0.90 $Al_2O_3$:0.10 $Ga_2O_3$:11.0 $SiO_2$:1.9 $Na_2O$:2.2 $K_2O$:1.0 [$(CH_3)_4N]O_2$:200 $H_2O$

As can be seen, the resultant hydrogel contains twice as much gallia as the mixture prepared in Example 1. The hydrogel is then heated and allowed to crystallize as described in Example 1. After about 14 hours, the hydrogel is essentially completely crystallized. The crystals of gallioaluminosilicate formed are washed with hot distilled water to remove excess reactants and then dried. The dried crystals have the following composition expressed in terms of oxide mole ratios in the anhydrous state:

0.92 $Al_2O_3$:0.08 $Ga_2O_3$:6.81 $SiO_2$:0.13 $Na_2O$:0.59 $K_2O$:0.28[$(CH_3)_4N]_2O$     (3)

An X-ray diffractogram of these dried crystals is obtained as described in Example 1 and is substantially similar to that set forth in FIG. 1 for a zeolite with the offretite structure. Thus, it is concluded that the crystals are that of a gallioaluminosilicate having the offretite structure. The unit cell parameters of the synthesized gallioaluminosilicate are set forth in Table 5 and are larger than those for a synthetic offretite zeolite, thereby indicating that gallium has been substituted for a portion of the aluminum in the framework structure. The crystals are calcined in flowing air at 550° C. for 10 hours to remove the tetramethylammonium cations. The calcined crystals have a BET surface area of 410 m²/gram and retain about 100 percent of their original crystallinity.

A comparison of the composition of the crystals formed in Example 2 as represented by formula (3) above with that of the crystals formed in Example 1 as represented by formula (2), indicates that doubling the amount of gallia in the mixture of the aluminosilicate hydrogel and the galliosilicate solution results in twice as much gallia in the crystals formed when the mixture is crystallized.

EXAMPLE 3

An aluminosilicate hydrogel and a galliosilicate solution are prepared as described in Example 1 and mixed together in proportions such that the resulting mixture has the following composition expressed in terms of oxide mole ratios:

0.85 $Al_2O_3$:0.15 $Ga_2O_3$:11.0 $SiO_2$:2.4 $Na_2O$:2.2 $K_2O$:1.0 [$(CH_3)_4N]O_2$:200 $H_2O$

As can be seen, the resultant hydrogel contains three times as much gallia as the mixture prepared in Example 1. The hydrogel is then heated and allowed to crystallize as described in Example 1. After about 14 hours, the hydrogel is essentially completely crystallized. The crystals of gallioaluminosilicate formed are washed with hot distilled water to remove excess reactants and then dried. The dried crystals have the following composition expressed in oxide mole ratios in the anhydrous state:

0.87 $Al_2O_3$: 0.13 $Ga_2O_3$:6.80 $SiO_2$:0.13 $Na_2O$:0.60 $K_2O$:0.27 [$(CH_3)_4N]O_2$     (4)

An X-ray diffractogram of the resultant dried crystals is obtained as described in Example 1 and is similar to that shown in FIG. 1. Thus, it is concluded that resultant crystalline gallioaluminosilicate has the offretite structure. As can be seen in Table 5, the gallioaluminosilicate has unit cell parameters larger than those for a synthetic offretite zeolite. These larger cell parameters confirm that some gallium has replaced aluminum in the offretite structure. The dried crystals are subjected to calcination in flowing air at 550° C. for 10 hours to remove the tetramethylammonium cations. The calcined crystals have a BET surface area of 410 m$^2$/gram and retain about 100 percent of their original crystallinity.

A comparison of the composition of the crystals formed in Example 3 as represented by formula (4) above with that of the crystals formed in Example 1 as represented by formula (2) indicates that tripling the amount of gallia in the mixture of the aluminosilicate hydrogel and the galliosilicate solution approximately triples the amount of gallia in the crystallized gallioaluminosilicate molecular sieve. Thus, Examples 2 and 3 demonstrate that the amount of gallia in the synthesized crystals of the gallioaluminosilicate can be controlled by controlling the amount of gallia in the hydrogel which is subjected to crystallization.

EXAMPLE 4

An aluminosilicate hydrogel and a galliosilicate solution are prepared as described in Example 1 and mixed together in proportions such that the resulting mixture has the following composition expressed in terms of oxide mole ratios:

0.80 Al$_2$O$_3$:0.20 Ga$_2$O$_3$:11.0 SiO$_2$:2.8 Na$_2$O:2.2 K$_2$O:1.0 [(CH$_3$)$_4$N]O$_2$:250 H$_2$O

As can be seen, the resultant hydrogel contains four times as much gallia as the mixture prepared in Example 1. The hydrogel is then heated and allowed to crystallize as described in Example 1. After about 18 hours, the hydrogel is essentially completely crystallized. An X-ray diffractogram of the resultant crystals is obtained as described in Example 1 and is similar to that shown in FIG. 1. Thus, it is concluded that the resultant crystalline gallioaluminosilicate has the offretite structure.

It will be apparent from the foregoing that the invention provides a relatively simple and rapid method for synthesizing a crystalline, gallioaluminosilicate molecular sieve having the offretite structure while controlling the amount of gallia in the crystallized sieve. Catalysts containing such a molecular sieve are useful in a variety of chemical conversion processes, particularly hydrocarbon conversion processes such as isomerization, hydrodewaxing and oligomerization.

Although this invention has been primarily described in conjunction with examples and by reference to embodiments thereof, it is evident that many alternatives, modifications and variations will be apparent to those skilled in the art in light of the foregoing description. Accordingly, it is intended to embrace within the invention all such alternatives, modifications and variations that fall within the spirit and scope of the appended claims.

I claim:

1. A process for synthesizing a crystalline, gallioaluminosilicate molecular sieve having the offretite structure which comprises:

(a) mixing a substantially gallia-free aluminosilicate hydrogel having the following oxide mole ratios of components SiO$_2$/Al$_2$O$_3$ = 8 to 15

(M$_2$O + N$_2$O)/Al$_2$O$_3$ = 1 to 10

H$_2$O/Al$_2$O$_3$ = 80 to 1000

Q$_2$O/Al$_2$O$_3$ = 0.1 to 10 with a galliosilicate solution substantially free of alumina and dispersed particles, said solution having the following oxide mole ratios of components SiO$_2$/Ga$_2$O$_3$ = 5 to 30

(M$_2$O of N$_2$O)/Ga$_2$O$_3$ = 6 to 20

H$_2$O/Ga$_2$O$_3$ = 200 to 800 to form a mixture of said hydrogel and said solution, wherein M is an alkali metal, N is an alkali metal other than M, Q is a cation derived from an offretite selective templating agent and said mixing is carried out by adding said galliosilicate solution to said aluminosilicate hydrogel; and (b) crystallizing said mixture to form a gallioaluminosilicate molecular sieve having the offretite structure.

2. A process as defined by claim 1 wherein M is sodium and N is potassium.

3. A process as defined by claim 2 wherein Q is a quaternary ammonium cation.

4. A process as defined by claim 3 wherein said quaternary ammonium cation is selected from the group consisting of a choline cation, a tetramethylammonium cation, a tetrapropylammonium cation, a tetraethylammonium cation and a tetrabutylammonium cation.

5. A process as defined by claim 3 wherein Q is a tetramethylammonium cation.

6. A process as defined by claim 2 wherein said aluminosilicate hydrogel is formed by dissolving sodium aluminate in an aqueous solution of sodium hydroxide and potassium hydroxide and adding a source of silica and said templating agent thereto.

7. A process as defined by claim 2 wherein said galliosilicate solution is formed by dissolving gallium oxide in an aqueous solution of sodium hydroxide and adding a source of silica thereto.

8. A process as defined by claim 1 wherein said mixture is crystallized at a temperature between about 70° C. and 250° C.

9. A process as defined by claim 1 wherein said mixture is crystallized at a temperature between about 90° C. and 120° C.

10. A process as defined by claim 1 wherein said crystallization takes place in about 24 hours or less.

11. A process for synthesizing a crystalline, gallioaluminosilicate molecular sieve having the offretite structure which comprises:

(a) mixing a source of alumina, a source of silica, a source of potassium, a source of sodium, an offretite selective templating agent and water to form an aluminosilicate hydrogel substantially free of gallia, said hydrogel having the following oxide more ratios of components SiO$_2$/Al$_2$O$_3$ = 8 to 15

(Na$_2$O + K$_2$O)/Al$_2$O$_3$ = 1 to 10

H$_2$O/Al$_2$O$_3$ = 80 to 1000

$Q_2O/Al_2O_3 = 0.1$ to 10 where Q is a cation derived from said templating agent;
(b) adding to said hydrogel a galliosilicate solution substantially free of alumina and dispersed particles, said solution having the following oxide mole ratios of components $SiO_2/Ga_2O_3 = 5$ to 30

$Na_2O/Ga_2O_3 = 6$ to 20

$H_2O/Ga_2O_3 = 200$ to 800 to form a mixture of said solution and said hydrogel containing between about 1 and 40 weight percent of said galliosilicate solution, said mixture having the following oxide mole ratios of components $SiO_2/(Al_2O_3 + Ga_2O_3) = 8$ to 30

$(Na_2O + K_2O)/(Al_2O_3 + Ga_2O_3) = 1$ to 15

$H_2O/(Al_2O_3 + Ga_2O_3) = 80$ to 1000

$Q_2O/(Al_2O_3 + Ga_2O_3) = 0.1$ to 10 wherein said galliosilicate solution is prepared by mixing a source of gallia, a source of silica, a source of sodium and water; and
(c) crystallizing said mixture at a temperature below about 250° C. to form a gallioaluminosilicate molecular sieve having the offretite structure, wherein said crystallization takes place in less than about 24 hours.

12. A process as defined by claim 11 wherein said source of gallia comprises gallium oxide.

13. A process as defined by claim 11 wherein said source of sodium comprises sodium hydroxide.

14. A process as defined by claim 11 wherein said source of potassium comprises potassium hydroxide.

15. A process as defined by claim 11 wherein said source of silica comprises a silica sol.

16. A process as defined by claim 11 wherein said source of alumina comprises aluminum oxide or sodium aluminate.

17. A process as defined by claim 11 wherein Q is selected from the group consisting of a quaternary ammonium cation and a protonated amine.

18. A process as defined by claim 17 wherein said quaternary ammonium cation is selected from the group consisting of a choline cation, a tetramethylammonium cation, a tetrapropylammonium cation, a tetraethylammonium cation and a tetrabutylammonium cation.

19. A process as defined by claim 17 wherein Q is a tetramethylammonium cation.

20. A process as defined by claim 11 wherein step (c) is carried out at a temperature between about 90° C. and about 120° C. and said crystallization is essentially complete in less than 14 hours.

21. A process as defined by claim 11 wherein said $Na_2O/Ga_2O_3$ ratio in the galliosilicate solution of step (b) is between about 8 and about 15.

22. A process as defined by claim 11 wherein the aluminosilicate hydrogel formed in step (a) has the following oxide mole ratios of components $SiO_2/Al_2O_3 = 9$ to 12

$(Na_2O + K_2O)/Al_2O_3 = 2$ to 5

$H_2O/Al_2O_3 = 100$ to 400

$Q_2O/Al_2O_3 = 0.5$ to 4.0.

23. A process as defined by claim 22 wherein the galliosilicate solution of step (b) has the following oxide mole ratios of components $SiO_2/Ga_2O_3 = 10$ to 20

$Na_2O/Ga_2O_3 = 8$ to 15

$H_2O/Ga_2O_3 = 300$ to 500.

24. A process as defined by claim 23 wherein the mixture of said aluminosilicate hydrogel and said galliosilicate solution has the following oxide mole ratios of components $SiO_2/(Al_2O_3 + Ga_2O_3) = 9$ to 16

$(Na_2O + K_2O)/(Al_2O_3 + Ga_2O_3) = 3$ to 6

$H_2O/(Al_2O_3 + Ga_2O_3) = 100$ to 300

$Q_2O/(Al_2O_3 + Ga_2O_3) = 0.5$ to 4.

25. A process as defined by claim 24 wherein said gallioaluminosilicate molecular sieve having the offretite structure has the following composition expressed in terms of oxide mole ratios in the anhydrous state $aAl_2O_3:bGa_2O_3:cSiO_2:dNa_2O:zK_2O:tQ_2O$ wherein a equals 0.5 to 0.99, b equals $(1-a)$, c equals 5.5 to 30, d equals 0.1 to 0.9, z equals 0.1 to 0.9, t equals 0.1 to 0.06 and $d+z+t$ equals about 1.0.

26. A process as defined by claim 25 wherein c equals 6 to 15.

27. A process for synthesizing a crystalline, gallioaluminosilicate molecular sieve having the offretite structure which consists essentially of:
(a) mixing a substantially gallia-free aluminosilicate hydrogel having the following oxide mole ratios of components $SiO_2/Al_2O_3 = 8$ to 15

$(Na_2O + K_2O)/Al_2O_3 = 1$ to 10

$H_2O/Al_2O_3 = 80$ to 1000

$Q_2O/Al_2O_3 = 0.1$ to 10 with a galliosilicate solution substantially free of alumina and dispersed particles, said solution having the following oxide mole ratios of components $SiO_2Ga_2O_3 = 5$ to 30

$Na_2O/Ga_2O_3 = 6$ to 20

$H_2O/Ga_2O_3 = 200$ to 800 to form a mixture of said hydrogel and said solution, wherein said mixing is carried out by adding said galliosilicate solution to said aluminosilicate hydrogel so that said mixture has the following oxide mole ratios of components $SiO_2/(Al_2O_3 + Ga_2O_3) = 8$ to 30

$(Na_2O + K_2O)/(Al_2O_3 + Ga_2O_3) = 1$ to 15

$H_2O/(Al_2O_3 + Ga_2O_3) = 80$ to 1000

$Q_2O/(Al_2O_3 + Ga_2O_3) = 0.1$ to 10 where Q is a quaternary ammonium cation or a protonated amine; and (b) crystallizing said mixture at a temperature between about 70° C. and about 250° c. to form a gallioaluminosilicate molecular sieve having the offretite structure.

28. A process as defined by claim 27 wherein said gallioaluminosilicate molecular sieve having the offretite structure has the following composition expressed in terms of oxide mole ratios in the anhydrous state $$aAl_2O_3:bGa_2O_3:cSiO_2:dNa_2O:zK_2O:tQ_2O$$

wherein a equals 0.5 to 0.99, b equals (1−a), c equals 5.5 to 30, d equals 1.0 to 0.9, z equals 0.1 to 0.9, t equals 0.1 to 0.6 and d+z+t equals about 1.0.

29. A process as defined by claim 27 wherein step (b) is carried out at a temperature between about 90° C. and about 120° C. for a period of time not exceeding about 24 hours.

30. A process as defined by claim 1 wherein said gallioaluminosilicate molecular sieve having the offretite structure has the following composition expressed in terms of oxide mole ratios in the anhydrous state $$aAl_2O_3:bGa_2O_3:cSiO_2:dNa_2O:zK_2O:tQ_2O$$

wherein a equals 0.5 to 0.99, b equals (1−a), c equals 5.5 to 30, d equals 1.0 to 0.9, z equals 0.1 to 0.9, t equals 0.1 to 0.6 and d+z+t equals about 1.0.

31. A process as defined by claim 1 wherein a sufficient amount of said galliosilicate solution is added to said aluminosilicate hydrogel so that the mixture of said solution and said hydrogel contains between about 1 and 40 weight percent of said solution.

32. A process as defined by claim 1 wherein the crystallization of said gallioaluminosilicate molecular sieve in step (b) is essentially complete in less than about 18 hours.

33. A process as defined by claim 11 wherein the $SiO_2/(Al_2O_3 + Ga_2O_3)$ mole ratio in the mixture of said galliosilicate solution and said aluminosilicate hydrogel equals 8 to 15.

34. A process as defined by claim 11 wherein the $SiO_2/(Al_2O_3 + Ga_2O_3)$ mole ratio in the mixture of said galliosilicate solution and said aluminosilicate hydrogel equals 8 to 11.

35. A process as defined by claim 27 wherein the crystallization of said gallioaluminosilicate molecular sieve in step (b) is essentially complete in less than about 24 hours.

36. A process as defined by claim 27 wherein a sufficient amount of said galliosilicate solution is added to said aluminosilicate hydrogel so that the mixture of said solution and said hydrogel contains between about 1 and 40 weight percent of said solution.

37. A process as defined by claim 1 wherein said crystalline, gallioaluminosilicate molecular sieve contains between about 13 and 17 weight percent alumina.

* * * * *

UNITED STATES PATENT AND TRADEMARK OFFICE
CERTIFICATE OF CORRECTION

PATENT NO. : 4,994,250

DATED : February 19, 1991

INVENTOR(S) : Mario L. Occelli

It is certified that error appears in the above-identified patent and that said Letters Patent is hereby corrected as shown below:

Claim 27, column 18, line 57, delete "$SiO_2Ga_2O_3=5$ to 30" and insert therefor -- $SiO_2/Ga_2O_3=5$ to 30 --.

Signed and Sealed this

Thirteenth Day of October, 1992

Attest:

DOUGLAS B. COMER

Attesting Officer

Acting Commissioner of Patents and Trademarks